United States Patent
Thankappan et al.

(10) Patent No.: US 9,798,561 B2
(45) Date of Patent: Oct. 24, 2017

(54) GUARDED VIRTUAL MACHINES

(71) Applicant: VMware, Inc., Palo Alto, CA (US)

(72) Inventors: Sudhish Panamthanath Thankappan, Bangalore (IN); Jithesh Kuruppath, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 660 days.

(21) Appl. No.: 14/069,370

(22) Filed: Oct. 31, 2013

(65) Prior Publication Data

US 2015/0121369 A1  Apr. 30, 2015

(51) Int. Cl.
G06F 9/455 (2006.01)
G06F 21/53 (2013.01)

(52) U.S. Cl.
CPC ...... *G06F 9/45533* (2013.01); *G06F 9/45558* (2013.01); *G06F 21/53* (2013.01); *G06F 2009/45587* (2013.01)

(58) Field of Classification Search
CPC .. G06F 21/53; G06F 9/45533; G06F 9/45558; G06F 2009/45587
USPC .......................................................... 718/1
See application file for complete search history.

(56) References Cited

U.S. PATENT DOCUMENTS

| | | | |
|---|---|---|---|
| 7,996,834 B2 * | 8/2011 | Araujo, Jr. | G06F 21/53 718/1 |
| 8,528,107 B1 * | 9/2013 | Ginzton | G06F 21/6281 713/193 |
| 8,687,814 B2 * | 4/2014 | Nord | G06F 21/602 380/278 |
| 8,739,252 B2 * | 5/2014 | Kuang | H04L 63/06 380/44 |
| 2005/0050377 A1 | 3/2005 | Chan et al. | |
| 2005/0071840 A1 | 3/2005 | Neiger et al. | |
| 2007/0192862 A1 | 8/2007 | Vermeulen et al. | |
| 2007/0250929 A1 | 10/2007 | Herington et al. | |
| 2007/0266433 A1 | 11/2007 | Moore | |
| 2008/0189769 A1 | 8/2008 | Casado et al. | |
| 2008/0196100 A1 | 8/2008 | Madhavan et al. | |
| 2008/0222717 A1 | 9/2008 | Rothstein et al. | |
| 2008/0244569 A1 | 10/2008 | Challener et al. | |
| 2008/0289028 A1 | 11/2008 | Jansen et al. | |
| 2009/0006603 A1 | 1/2009 | Duponchel et al. | |
| 2009/0031303 A1 * | 1/2009 | Frank | G06F 12/1475 718/1 |
| 2009/0113031 A1 | 4/2009 | Ruan et al. | |
| 2009/0122710 A1 | 5/2009 | Bar-Tor et al. | |
| 2009/0249473 A1 | 10/2009 | Cohn | |

(Continued)

OTHER PUBLICATIONS

Apple Developer "Authorization Services Programming Guide" Oct. 11, 2011, pp. 1-44.*

(Continued)

*Primary Examiner* — Benjamin Wu
*Assistant Examiner* — Willy W Huaracha

(57) ABSTRACT

A virtual machine (VM) is designated as a guarded VM so that restricted operations may not be performed on the VM without permission from the VM's owner. A request to perform at least one of the restricted operations on the VM is received. When the VM is a guarded VM, the request to perform at least one of the restricted operations on the VM is sent to the VM's owner. When the VM's owner at least partially approves the request, at least some of the restricted operations on the VM are enabled.

15 Claims, 6 Drawing Sheets

(56) References Cited

U.S. PATENT DOCUMENTS

| | | |
|---|---|---|
| 2010/0138830 A1 | 6/2010 | Astete et al. |
| 2010/0235831 A1 | 9/2010 | Dittmer |
| 2011/0072486 A1 | 3/2011 | Hadar et al. |
| 2011/0078497 A1 | 3/2011 | Lyne et al. |
| 2011/0107331 A1 | 5/2011 | Evans et al. |
| 2011/0107406 A1 | 5/2011 | Frost et al. |
| 2011/0119748 A1 | 5/2011 | Edwards et al. |
| 2011/0138225 A1* | 6/2011 | Gunabalasubramaniam ............ G06F 11/1417 714/15 |
| 2011/0258701 A1 | 10/2011 | Cruz et al. |
| 2011/0302415 A1* | 12/2011 | Ahmad ............... G06F 21/57 713/168 |
| 2012/0151480 A1* | 6/2012 | Diehl .................. G06F 9/461 718/1 |
| 2012/0192181 A1* | 7/2012 | Gilbert ............ G06F 9/45558 718/1 |
| 2013/0074181 A1 | 3/2013 | Singh |
| 2013/0347131 A1 | 12/2013 | Mooring et al. |

OTHER PUBLICATIONS

"Virtual Reality—Setting the Record Straight One Post at a Time," Eric Horschman, Jun. 25, 2008, <Retrieved from the Internet at URL: http://blogs.vmware.com/virtualreality/2008/06/a-look-at-some.html>.

"VMware vSphere 4—ESX and vCenter Server, Default Roles for ESX/ESXi and vCenter Server", <Retrieved from the Internet at URL: http://pubs.vmware.com/vsphere-4-esx-vcenter/index.jsp?topic=/com.vmware.vsphere.dcadmin.doc_41/vsp_dc_admin_guide/managing_users_groups_roles_and_permissions/r_default_roles_for_esx_esxi_and_vcenter_server.html>, printed on Oct. 31, 2013.

Garfinkel, Tal, et al., "A Virtual Machine Introspection Based Architecture for Intrusion Detection," in Proc. Network and Distributed Systems Security Symposium, Feb. 2003, 16 pages.

* cited by examiner

GUARDED VIRTUAL MACHINES

BACKGROUND

Virtualization software may be used to increase server hardware utilization and reduce costs in data centers. One component of virtualization software, the hypervisor, abstracts server hardware resources and makes them shareable by multiple virtual machines (VMs), which are abstractions of and function like physical computers. Using the hypervisor or some other component, a virtualization software administrator or the owner of a VM can create, configure and manage the operation of the VMs.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are therefore not to be considered limiting of its scope, and the disclosure will be described with additional specificity and detail through use of the accompanying drawings.

In the drawings.

DETAILED DESCRIPTION

One important feature of a virtual machine (VM) system is the ability to determine which virtualization software users are authorized to manipulate or operate a VM. Note that virtualization software users are typically assigned to one or more groups that inherently define the scope of their privileges with respect to their ability to manipulate or operate VMs. For the purposes of this discussion, three groups will be discussed: 1) administrators, 2) VM power users, and 3) ordinary users, but many other types of groups could be defined. Privileges may include powering on a VM, suspending a VM, powering off a VM, moving a VM, deleting a VM, changing the attributes of a VM, but many other privileges could be defined. An administrator may use a component within the virtualization software called an access control system to specify which users or groups are authorized to manipulate or operate a VM and to what extent. For example, the administrator may specify that user A or users within group B are authorized to change various attributes about the VM, power the VM on or off, but not move or delete the VM.

Typically, administrators or VM power users have more privileges than ordinary users and may change a VM's configuration or even delete a VM without additional authorization. This may adversely impact VM availability, such as when an administrator or a VM power user unintentionally modifies, deletes, or powers off a VM.

An administrator can directly modify a VM configuration file (e.g., a vmx configuration file) from the command line interface (CLI) of a hypervisor. A change made directly to the VM configuration file while the VM is powered on does not take effect because it is not preserved after the VM is powered off. However, changes made to the VM configuration file while the VM is powered off would take effect when the VM is powered on.

Ordinary users may employ credentials to limit access to VM and/or access the data saved on a virtual machine disk (VMDK) attached to the VM. However, one way for an administrator to circumvent these credentials is by following these steps. First the administrator creates a second VM and grants himself login/read/write access to that VM. Second, the administrator attaches the VMDK from the user's VM to that second VM. Because the administrator has login access to read the data on the second VM, he may then access data on the VMDK attached from the user's VM.

In examples of the present disclosure, a VM may be set as a new type of VM called "guarded VM." Access to the guarded VM is limited by an authorization mechanism that seeks the approval of the guarded VM's owner before an administrator may perform restricted operations such as changing, deleting, or powering off the guarded VM. The VM's owner may be the person who uses the VM, is authorized to approve changes to the VM, or any other user designated as the owner.

Figure 1:
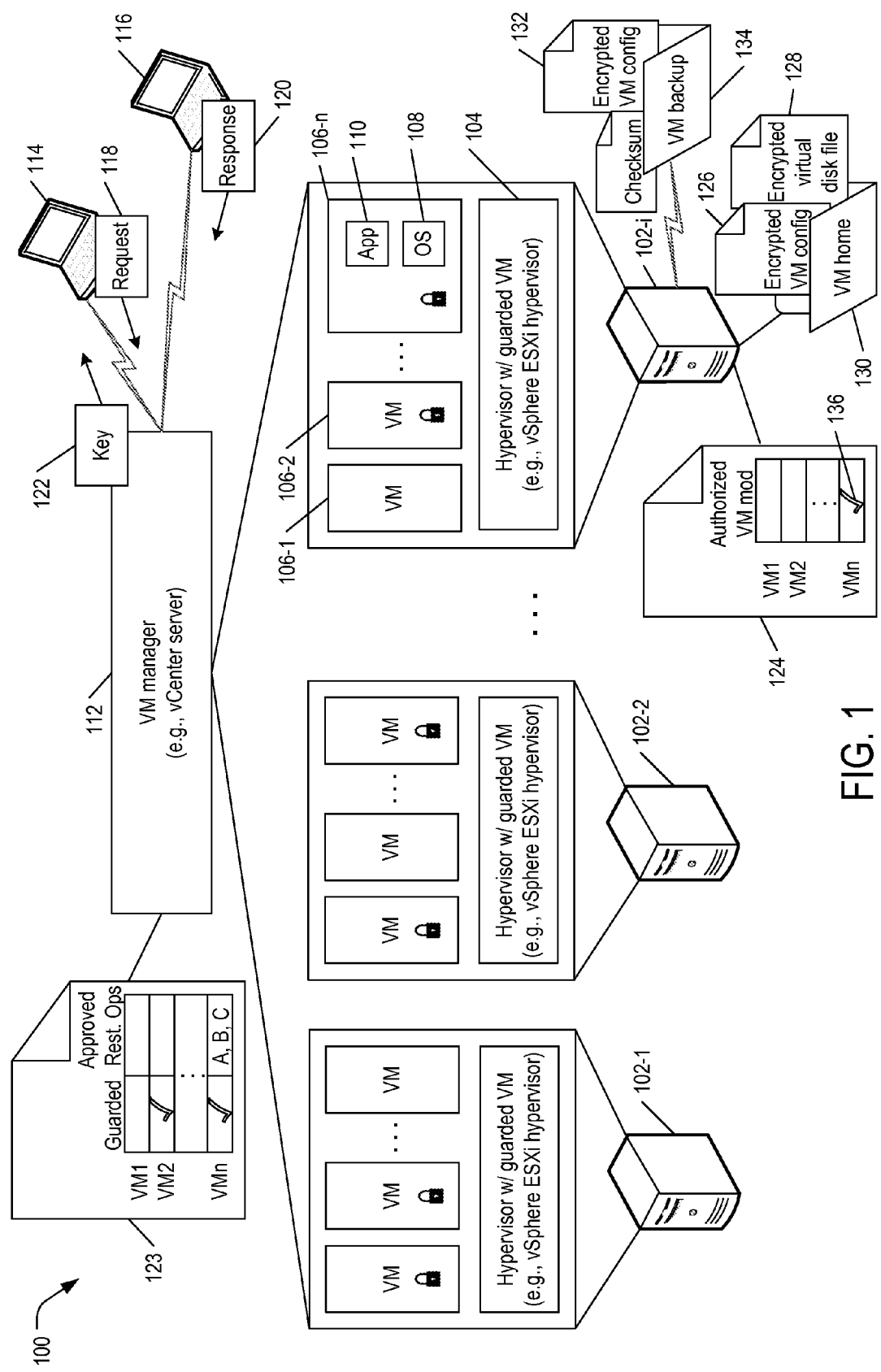
FIG. 1 is a block diagram illustrating a simplified view of a virtualized system in examples of the present disclosure.

FIG. 1 is a block diagram illustrating a simplified view of a VM system 100 in examples of the present disclosure. System 100 includes physical servers 102-1, 102-2 . . . 102-$i$ (collectively as "physical servers 102"). Physical server 102-$i$ runs a hypervisor 104 that creates and runs VMs 106-1, 106-2 . . . 106-$n$ (collectively as "VMs 106" or as a generic individual "VM 106"). VM 106-$n$ includes virtualized memory and processor that executes a guest operating system (OS) 108 and one or more applications 110. Other VMs 106 may be similarly configured as VM 106-$n$, and other physical servers 102 may be similarly configured as physical server 102-$i$.

Hypervisors 104 have a guarded VM feature that allows a VM owner to designate a VM 106 as a guarded VM. For example, VMs 106-2 and 106-$n$ are guarded VMs. A guarded VM has an authorization mechanism that seeks the VM owner's approval before the guarded VM is unlocked to allow an administrator to perform certain restricted operations on the guarded VM. An administrator may protect a VM by designating it as a guarded VM using a command line interface (CLI) to hypervisors 104 or by using VM manager 112.

A VM manager 112 provides a user interface (UI) to centrally provision and manage VMs 106, including the ability to unlock a guarded VM through the authorization mechanism. VM manager 112 may include a web client that allows an administrators and VM owners to manage VMs 106 from a browser. For example, an administrator uses a computer 114 and a VM owner uses a computer 116 to remotely access VM manager 112 to provision and manage VMs 106. Alternatively the administrator locally accesses the UI of VM manager 112 or the CLI to hypervisors 104 to provision and configure VMs 106.

In some embodiments, when a VM is designated as a guarded VM, some VM operations may be disabled. Some of the more typical operations that are disabled on a guarded VM can include, but are not limited to: 1) editing a VM through the UI of VM manager 112; 2) accessing a VM through the CLI to hypervisors 104; 3) performing OS commands on a VM; 4) powering on, powering off, suspending, and rebooting a VM; and 5) migrating a VM. Once the options are disabled, an administrator must seek the permission of the VM owner to change or use them.

Figure 2:
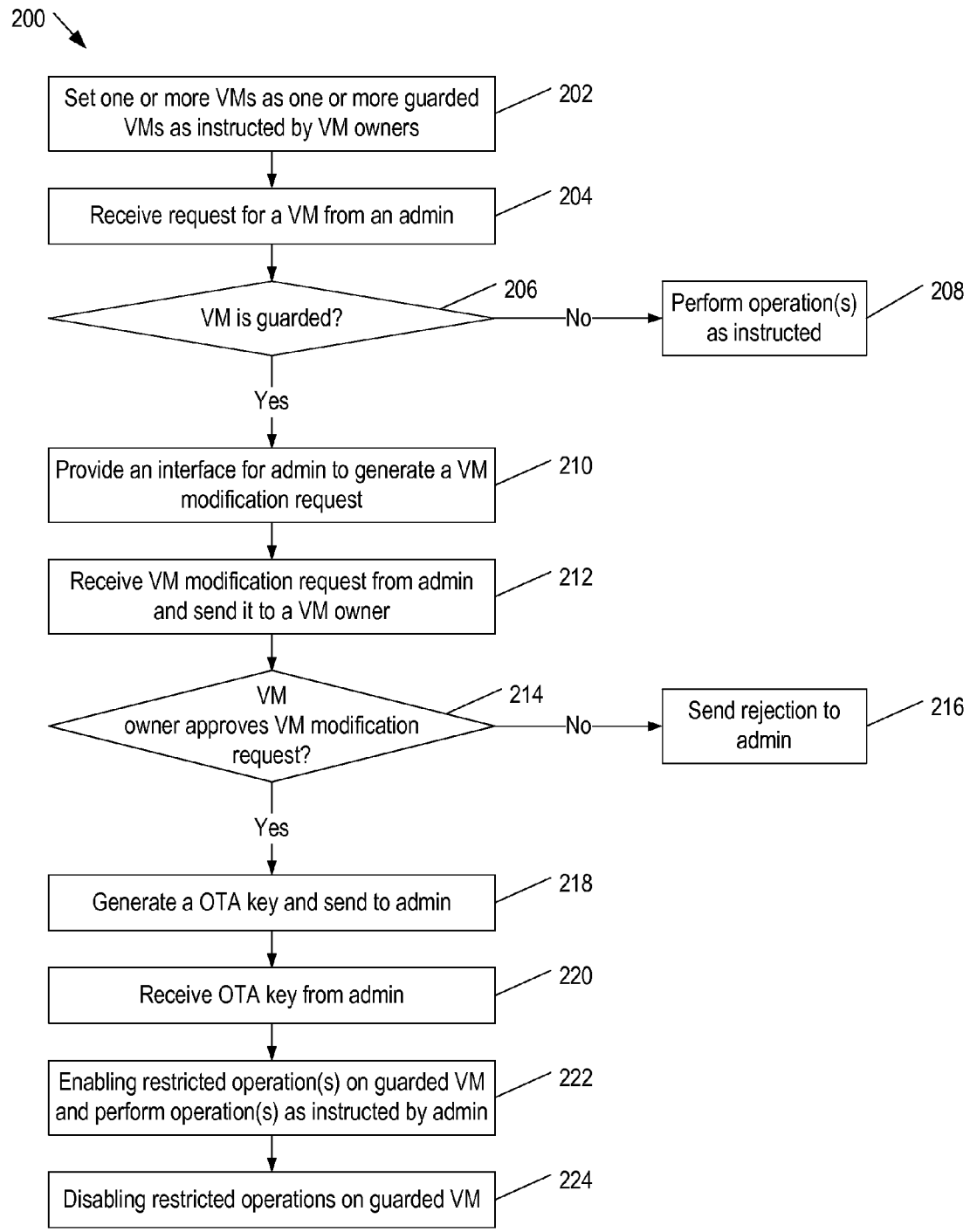
FIG. 2 is a flowchart of a first method for a virtual machine (VM) manager to safeguard VMs in examples of the present disclosure.

FIG. 2 is a flowchart of a method 200 for VM system 100 (FIG. 1), more specifically VM manager 112 (FIG. 1), to safeguard VMs 106 (FIG. 1) in examples of the present disclosure. Method 200 may begin in block 202.

In block 202, VM manager 112 protects a VM 106 by setting the VM as a guarded VM so a number of operations may not be performed on the VM without permission from the VM's owner. For example, VM manager 112 may provide a UI where the VM owner may check a box to set a VM, such as VM 106-*n* (FIG. 1), as a guarded VM. VM manager 112 may prompt the VM owner for additional information used to contact the VM owner in the authorization mechanism, such as name, email address, and mobile phone number. VM manager 112 then instructs a hypervisor 104 (FIG. 1) running VM 106-*n* to set the VM as a guarded VM. In response, hypervisor 104 changes a VM configuration file 126 (FIG. 1) of VM 106-*n* to record VM 106-*n* as a guarded VM. VM manager 112 may keep a local table 123 (FIG. 1) to track the guarded status of VMs 106. In some embodiments, a guarded VM may have only one owner. Block 202 may be followed by block 204.

In block 204, VM manager 112 receives a request from a requester, such as an administrator, to view or otherwise access a VM, such as VM 106-*n*. Block 204 may be followed by block 206.

In block 206, VM manager 112 determines if the requested VM, such as VM 106-*n*, is a guarded VM. If no, block 206 may be followed by block 208. Otherwise block 206 may be followed by block 210. VM manager 112 may determine if a requested VM is a guarded VM from local table 123 or by querying a hypervisor 104.

In block 208, VM manager 112 performs one or more operations on the requested VM as instructed by the administrator. As the requested VM is not a guarded VM, the administrator may perform restricted operations. Method 200 may end at block 208 or loop back to block 202.

In block 210, VM manager 112 provides an interface for the administrator to generate a VM modification request 118 (FIG. 1). The interface allows the administrator to provide information to be included in VM modification request 118, such as the restricted operations to be performed on the VM, the expected downtime duration, and details about the administrator. The interface may also indicate the restricted operations that are not available on a guarded VM. For example, the restricted operations may be grayed out or an interface may be disabled in VM Manager 112. Block 210 may be followed by block 212.

In block 212, VM manager 112 receives VM modification request 118 from the administrator and sends it to the guarded VM's owner. VM manager 112 may send VM modification request 118 by email or text message. The VM owner may approve or reject VM modification request 118. For example, the VM owner clicks a link in the email or text message to send a response 120 (FIG. 1) to VM manager 112. Block 212 may be followed by block 214.

In block 214, VM manager 112 determines if the VM owner approves VM modification request 118. If no, block 214 may be followed by block 216. Otherwise block 214 may be followed by block 218.

In block 216, VM manager 112 sends a rejection notice the administrator and the guarded VM remains protected so the administrator cannot perform any of the restricted operations on the guarded VM. Method 200 may end at block 216 or loop back to block 202.

In block 218, VM manager 112 generates a onetime authorization (OTA) key 122 (FIG. 1) for the guarded VM and sends the key to the administrator. VM manager 112 may send OTA key 122 by email or text message. Block 218 may be followed by block 220.

In block 220, VM manager 112 receives from the administrator an OTA key 122 for a guarded VM. For example, the administrator inputs OTA key 122 for guarded VM 106-*n* in the interface provided by VM manager 112, which verifies the key against its copy for guarded VM 106-*n*. Block 220 may be followed by block 222.

In block 222, VM manager 112 unlocks the guarded VM by enabling one or more restricted operations on the guarded VM. Specifically VM manager 112 instructs hypervisor 104 to enable one or more restricted operation on the guarded VM. In response, hypervisor 104 changes the VM configuration file of the guarded VM, such as VM configuration file 126 (FIG. 1) of VM 106-*n*, to enable one or more restricted operations. In some embodiments, unlocking the guarded VM means allowing all restricted operations. In other embodiments, unlocking the guarded VM means allowing only those operations included in VM modification request 118. VM manager 112 then performs one or more operations on the requested VM as instructed by the administrator. Block 222 may be followed by block 224.

In block 224, VM manager 112 locks the guarded VM by disabling the restricted operation on the guarded VM. Specifically VM manager 112 instructs hypervisor 104 to disable the restricted operations on the guarded VM so the administrator cannot perform any of the restricted operations on the guarded VM. Method 200 may end at block 224 or loop back to block 202.

Figure 3:
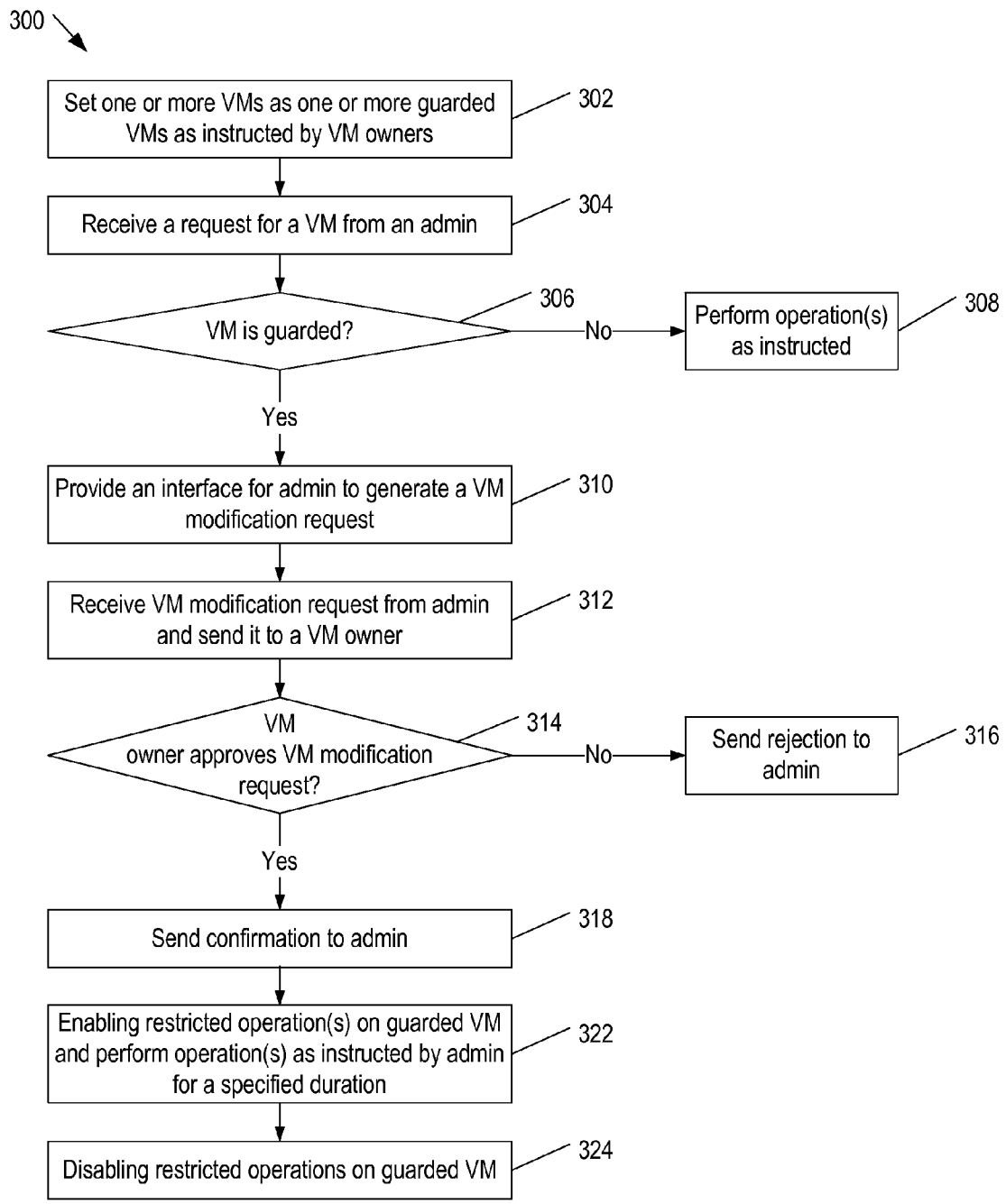
FIG. 3 is a flowchart of a second method for a VM manager to safeguard VMs in examples of the present disclosure.

FIG. 3 is a flowchart of a method 300 for VM system 100 (FIG. 1), more specifically VM manager 112 (FIG. 1), to safeguard VMs 106 (FIG. 1) in examples of the present disclosure. Method 300 is similar to method 200 (FIG. 2) except an OTA key 122 (FIG. 1) is not generated. Instead VM manager 112 unlocks a guarded VM for a specified duration. Method 300 may begin in block 302.

In block 302, VM manager 112 protects a VM 106 by setting the VM as a guarded VM so a number of operations may not be performed on the VM without permission from the VM's owner. Block 202 may be followed by block 204.

In block 304, VM manager 112 receives a request from an administrator to view or otherwise access a VM, such as VM 106-*n* (FIG. 1). Block 304 may be followed by block 306.

In block 306, VM manager 112 determines if the requested VM, such as VM 106-*n*, is a guarded VM. If no, block 306 may be followed by block 308. Otherwise block 306 may be followed by block 310.

In block 308, VM manager 112 performs one or more operations on the requested VM as instructed by the administrator. Method 300 may end at block 208 or loop back to block 202.

In block 310, VM manager 112 provides an interface for the administrator to generate a VM modification request 118 (FIG. 1). Block 310 may be followed by block 212.

In block 312, VM manager 112 receives VM modification request 118 from the administrator and sends it to the guarded VM's owner. Block 312 may be followed by block 314.

In block 314, VM manager 112 determines if the VM owner approves VM modification request 118. If no, block 314 may be followed by block 316. Otherwise block 314 may be followed by block 318.

In block 316, VM manager 112 sends a rejection notice the administrator and the guarded VM remains protected so the administrator cannot perform any of the restricted operations on the guarded VM. Method 300 may end at block 316 or loop back to block 302.

In block 318, VM manager 112 (FIG. 1) sends a confirmation of the VM owner's approval of VM modification request 118 to the requesting administrator. VM manager 112 may send the confirmation by email or text message. Block 318 may be followed by block 322.

In block 322, VM manager 112 unlocks the guarded VM for a specified duration and performs one or more restricted operations as instructed by the administrator in that duration. Specifically VM manager 112 instructs hypervisor 104 to enable the restricted operations on the guarded VM. In response, hypervisor 104 changes the VM configuration file of the guarded VM, such as VM configuration file 126 (FIG. 1) of VM 106-n, to enable the restricted operations. Block 322 may be followed by block 324.

In block 324, VM manager 112 locks the guarded VM by disabling the restricted operations on the guarded VM. Method 300 may end at block 324 or loop back to block 302.

Figure 4:
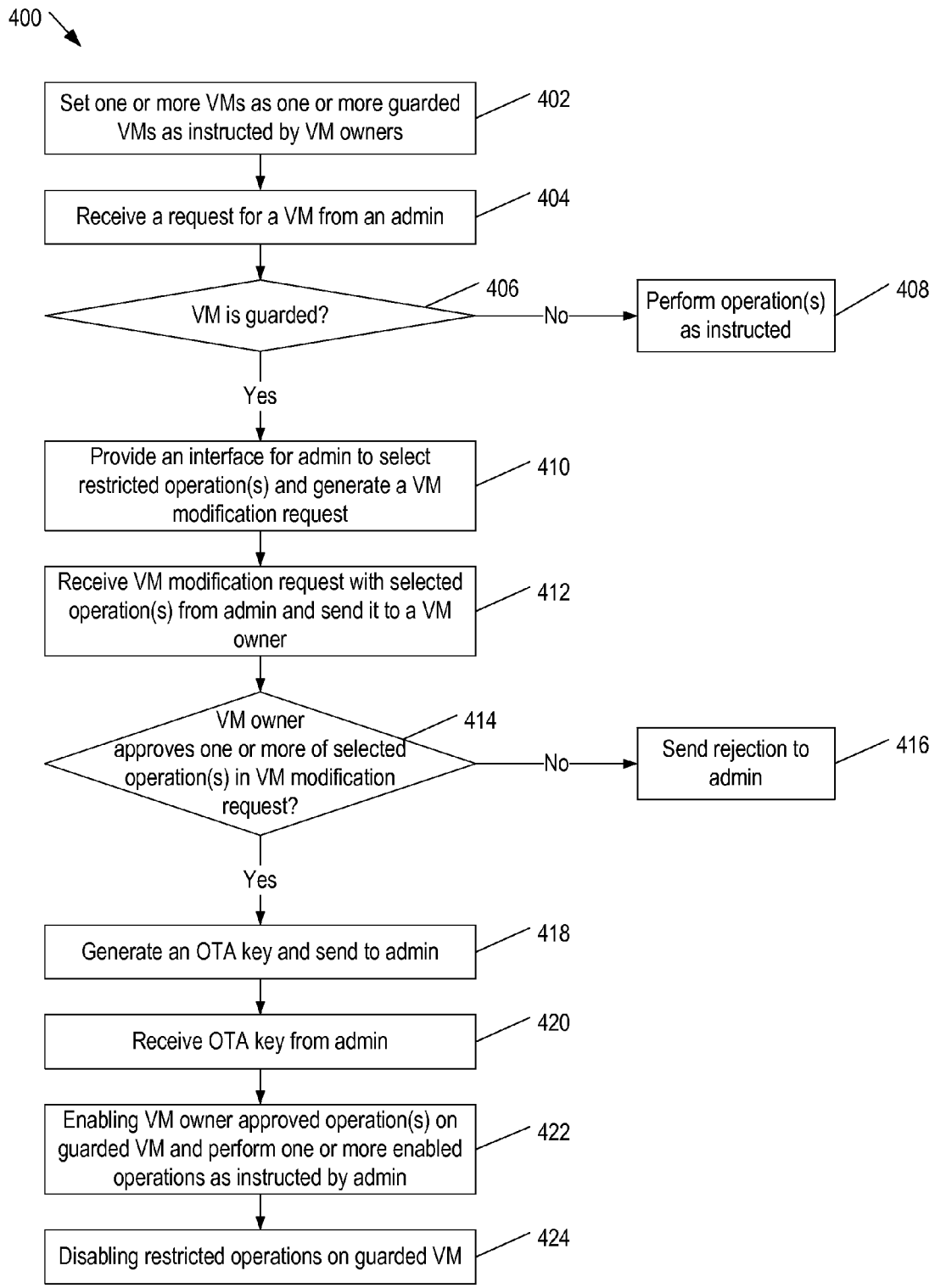
FIG. 4 is a flowchart of a third method for a VM manager to safeguard VMs in examples of the present disclosure.

FIG. 4 is a flowchart of a method 400 for VM system 100 (FIG. 1), more specifically VM manager 112 (FIG. 1), to safeguard VMs 106 (FIG. 1) in examples of the present disclosure. Method 400 is similar to method 200 (FIG. 2) except that the requesting administrator may only perform the one or more restricted operations identified in a VM modification request 118 (FIG. 1) and approved by the VM's owner. Method 400 may begin in block 402.

In block 402, VM manager 112 protects a VM 106 by setting the VM as a guarded VM so a number of operations may not be performed on the VM without permission from the VM's owner. Block 402 may be followed by block 404.

In block 404, VM manager 112 receives a request from an administrator to view or otherwise access a VM, such as VM 106-n (FIG. 1). Block 404 may be followed by block 406.

In block 406, VM manager 112 determines if the requested VM, such as VM 106-n, is a guarded VM. If no, block 406 may be followed by block 408. Otherwise block 406 may be followed by block 410.

In block 408, VM manager 112 performs one or more operations on the requested VM as instructed by the administrator. Method 400 may end at block 408 or loop back to block 402.

In block 410, VM manager 112 provides an interface for the administrator to select one or more restricted operations to be performed on the VM and generate a VM modification request 118 (FIG. 1). The interface allows the administrator to provide information to be included in VM modification request 118, such as one or more selected operations to be performed on the VM, the expected downtime duration, and details about the administrator. The interface may also indicate the restricted operations that are not available on a guarded VM. For example, the restricted operations may be grayed out in the UI of the VM manager 112. Block 410 may be followed by block 412.

In block 412, VM manager 112 receives VM modification request 118 with the selected operations from the administrator and sends it to the guarded VM's owner. VM manager 112 may send VM modification request 118 by email or text message. The VM owner may approve or reject VM modification request 118. For example, the VM owner clicks a link in the email or text message to send a response 120 (FIG. 1) to VM manager 112.

In one embodiment, the VM owner may approve some but not all of the selected operations in VM modification request 118. For example, the VM owner clicks a link in the email or text message and is brought to an interface provided by VM manager 112 to approve one or more of the selected operations in the VM modification request 118. Block 412 may be followed by block 414.

In block 414, VM manager 112 determines if the VM owner approves one or more selected operations in VM modification request 118. If no, block 414 may be followed by block 416. Otherwise block 414 may be followed by block 418.

In block 416, VM manager 112 sends a rejection notice the administrator and the guarded VM remains protected so the administrator cannot perform any of the restricted operations on the guarded VM. Method 400 may end at block 416 or loop back to block 402.

In block 418, VM manager 112 generates a onetime authorization (OTA) key 122 (FIG. 1) for the guarded VM and sends the key to the administrator. Block 418 may be followed by block 420.

In block 420, VM manager 112 receives from the administrator an OTA key 122 for a guarded VM, such as VM 106-n, and verifies the key against its copy for guarded VM 106-n. Block 420 may be followed by block 422.

In block 422, VM manager 112 unlocks the guarded to perform only the selected operations approved by the VM owner. Specifically VM manager 112 instructs hypervisor 104 to enable the approved operations. In response, hypervisor 104 changes the VM configuration file of the guarded VM, such as VM configuration file 126 (FIG. 1) of VM 106-n, to enable the approved operations. VM manager 112 then performs one or more enabled operations on the requested VM as instructed by the administrator. Block 422 may be followed by block 424.

In block 424, VM manager 112 locks the guarded VM by disabling the restricted operations. Method 400 may end at block 424 or loop back to block 402.

In examples of the present disclosure, a hypervisor may also prevent an administrator from directly modifying the VM configuration file of a guarded VM from the CLI of the hypervisor without the permission of the VM's owner. A VM's home folder may contain the VM's configuration file, the VM's virtual disk file, and other files that comprise the VM such as a VM's delta disk file. When a VM is set as a guarded VM, the hypervisor makes a copy of the VM configuration file from the home folder of the guarded VM and saves it in a backup folder at a secure location with only read access for all users. The hypervisor also performs a checksum, such as a md5 checksum, on the VM configuration file and saves the checksum in the backup folder.

A flag named "authorized VM modification" may be set for a VM when a change is made to the VM configuration file with the permission of the VM's owner. When a guarded VM powers on, the hypervisor checks its authorized VM modification flag. If the authorized VM modification flag is set, the hypervisor copies the VM configuration file from the backup folder and overwrite the VM configuration file in the home folder. This puts the VM in the state when it was modified with the VM owner's approval. If the authorized VM modification flag is not set, the hypervisor generates a checksum on the VM configuration file in the home folder and compares it against the checksum in the backup folder. If the checksums match, the hypervisor powers on the guarded VM. If the checksums do not match, the hypervisor reverts the guarded VM to its prior state by copying the VM configuration file in the backup folder and overwriting the modified VM configuration file in the home folder.

Furthermore, the hypervisor may encrypt user data written to the VM's virtual disk file (e.g., VMDK) and provide access to the user data through a VM owner login. Thus the data would not be accessible to others even if the virtual disk file is attached to another VM. In addition, the home folder that holds the VM configuration file and the virtual disk file may be protected using password or user permission. For example, the VM configuration file may be made immutable.

Figure 5:
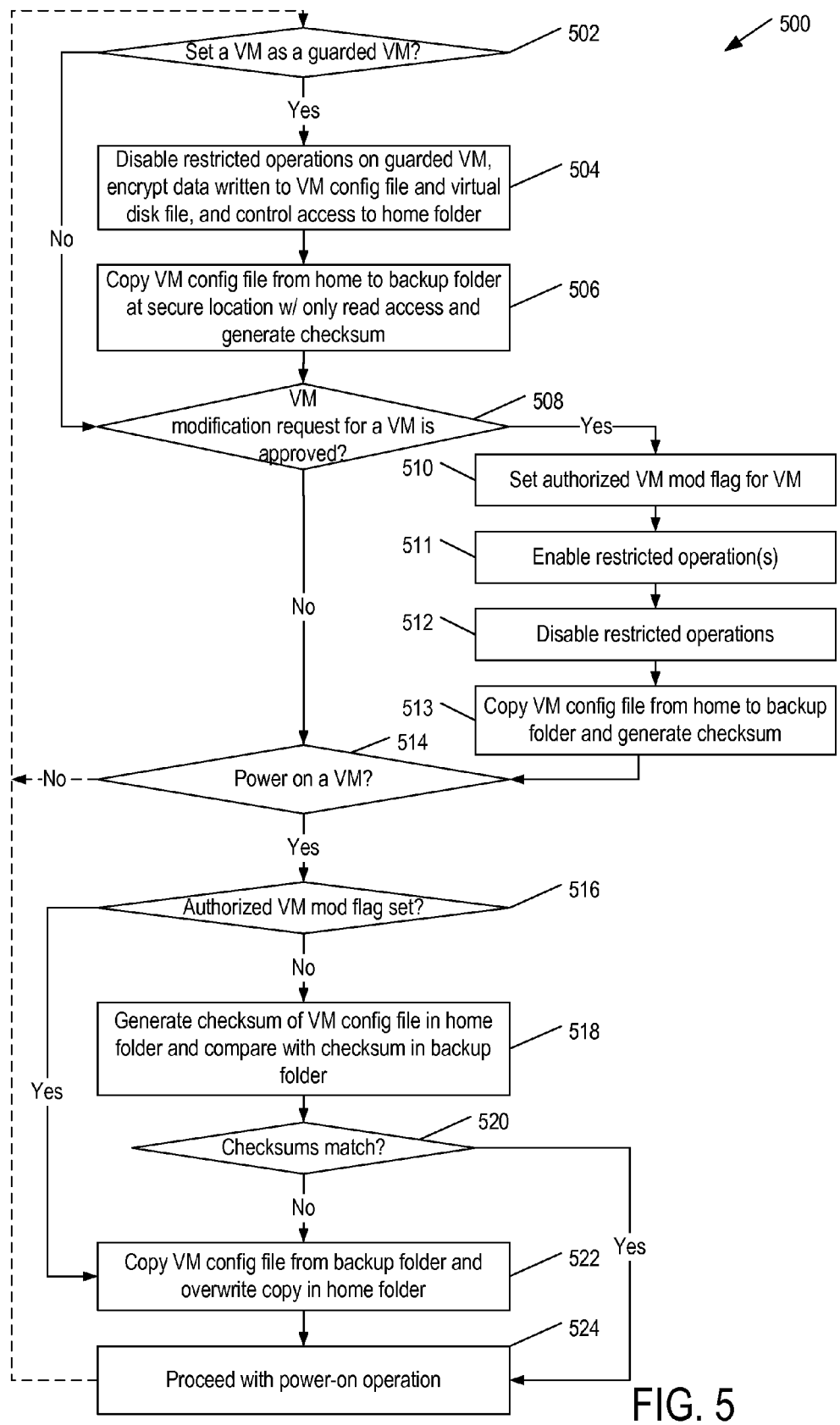
FIG. 5 is a flowchart of a first method for a hypervisor to safeguard VMs in examples of the present disclosure.

FIG. 5 is a flowchart of a method 500 for VM system 100 (FIG. 1), more specifically hypervisors 104 (FIG. 1), to protect guarded VMs in examples of the present disclosure. Method 500 may begin in block 502.

In block 502, a hypervisor 104 determines if it is to set a VM, such as VM 106-n (FIG. 1), as a guarded VM. Hypervisor 104 may receive an instruction from a VM owner through VM manager 112 (FIG. 1) or its own CLI to set VM 106-n as a guarded VM. If so, block 502 may be followed by block 504. Otherwise block 502 may be followed by block 508.

In block 504, hypervisor 104 changes VM configuration file 126 (FIG. 1) of VM 106-n to set VM 106-n as a guarded VM. Once set as a guarded VM, hypervisor 104 protects guarded VM 106-n by disabling all the restricted operations on VM 106-n. Hypervisor 104 may also encrypt data written to VM configuration file 126 and virtual disk file 128 (FIG. 1). Hypervisor 104 may further control access to the VM's home folder 130 (FIG. 1) that holds the VM's files with using password or user permission. Block 504 may be followed by block 506.

In block 506, hypervisor 104 makes a copy 132 (FIG. 1) of VM configuration file 126 and saves it to a backup folder 134 (FIG. 1). Backup folder 134 may be located at a secure location with only read access for all users. Hypervisor 104 also generates a checksum for VM configuration file 132 and stores it in backup folder 134. Block 506 may be followed by block 508.

In block 508, hypervisor 104 determines if a VM owner has approved a VM modification request 118 (FIG. 1) for a guarded VM (e.g., VM 106-n). If so, block 508 may be followed by block 510. Otherwise block 508 may be followed by block 514. Hypervisor 104 may determine a VM owner has approved VM modification request 118 for guarded VM 106-n when it receives instruction from VM manager 112 to unlock VM 106-n and enable all the restricted operations. As described above, in some embodiments, VM manger 112 may instruct hypervisor 104 to enable only some of the restricted operations.

In block 510, hypervisor 104 sets the authorized VM modification flag 136 (FIG. 1) for guarded VM 106-n in table 124. Block 510 may be followed by block 511.

In block 511, hypervisor 104 unlocks guarded VM 106-n by enabling all the restricted operations on guarded VM 106-n. Block 511 may be followed by block 512.

In block 512, after changes have been made to guarded VM 106-n with the VM owner's approval, hypervisor locks guarded VM 106-n. Specifically, hypervisor 104 receives instruction from VM manager 112 to lock guarded VM 106-n by disabling all the restricted operations. Block 512 may be followed by block 513.

In block 513, hypervisor 104 copies VM configuration file 126 and overwrites the old VM configuration file 132 in backup folder 134 to capture the current state of VM 106-n. Hypervisor 104 also generates a checksum for the new VM configuration file 132 and stores it in backup folder 134. Block 513 may be followed by block 514.

In block 514, hypervisor 104 determines if a VM, such as VM 106-n, is to be powered on. If so, block 514 may be followed by block 516. Otherwise method 500 may end or loop back to block 502. Hypervisor 104 may determine VM 106-n is to power on when it receives instruction to power on VM 106-n from VM manager 112 or its CLI.

In block 516, hypervisor 104 determines if the authorized VM modification flag 136 for VM 106-n is set in table 124. If so, hypervisor 104 may reset the authorization VM modification flag 136 for VM 106-n and block 516 may be followed by block 522. Otherwise block 516 may be followed by block 518.

In block 518, hypervisor 104 generates a checksum of VM configuration file 126 in home folder 130 and compares it against the checksum stored in backup folder 134. Block 518 may be followed by block 520.

In block 520, hypervisor 104 determines if the checksums match. If no, then VM configuration file 126 has been modified without the VM owner's approval and block 520 may be followed by block 522. Otherwise block 520 may be followed by block 524.

In block 522, hypervisor 104 copies VM configuration file 132 from backup folder 134 and overwrites the VM configuration file 126 in home folder 130. This restores the VM to either the prior state before it was modified without the VM owner's, or the last state when it was modified with the VM owner's approval. Block 522 may be followed by block 524.

In block 524, hypervisor 104 proceeds to power on VM 106-n. Method 500 may end at block 524 or loop back to block 502.

Figure 6:
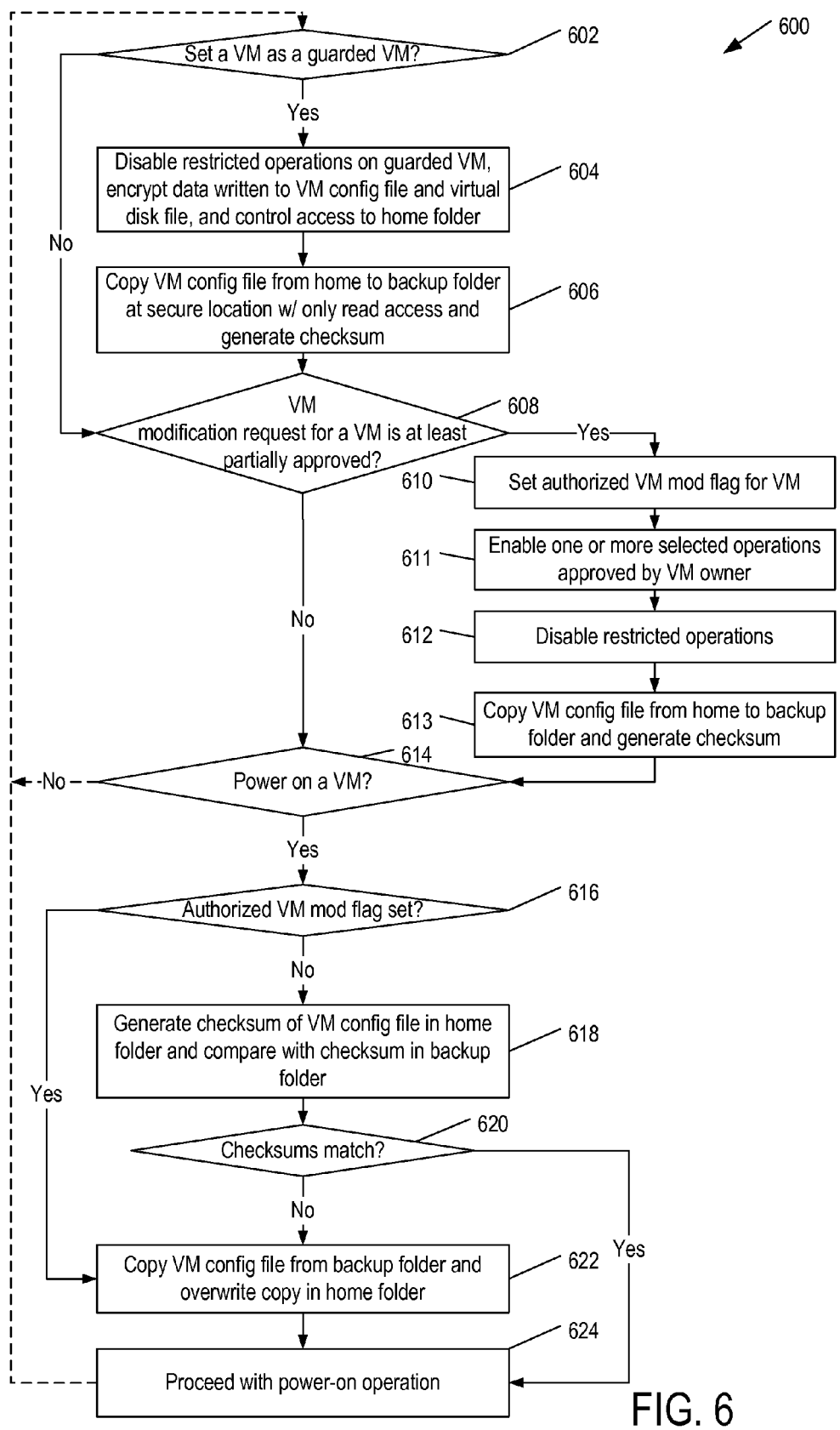
FIG. 6 is a flowchart of a second method for a hypervisor to safeguard VMs in examples of the present disclosure.

FIG. 6 is a flowchart of a method 600 for VM system 100 (FIG. 1), more specifically hypervisors 104 (FIG. 1), to protect guarded VMs in examples of the present disclosure. Method 600 is similar to method 500 (FIG. 5) except that the requesting administrator may only perform the one or more restricted operations identified in a VM modification request 118 (FIG. 1) and approved by the VM's owner. Method 600 may begin in block 602.

In block 602, a hypervisor 104 determines if it is to set a VM, such as VM 106-n (FIG. 1), as a guarded VM. If so, block 502 may be followed by block 504. Otherwise block 502 may be followed by block 508.

In block 604, hypervisor 104 changes VM configuration file 126 (FIG. 1) of VM 106-n to set VM 106-n as a guarded VM. Hypervisor 104 may also encrypt data written to VM configuration file 126 and virtual disk file 128 (FIG. 1). Hypervisor 104 may further control access to the VM's home folder 130 (FIG. 1) that holds the VM's files with using password or user permission. Block 604 may be followed by block 606.

In block 606, hypervisor 104 makes a copy 132 (FIG. 1) of VM configuration file 126 and saves it to a backup folder 134 (FIG. 1). Hypervisor 104 also generates a checksum for VM configuration file 132 and stores it in backup folder 134. Block 606 may be followed by block 608.

In block 608, hypervisor 104 determines if a VM owner has at least partially approved a VM modification request 118 (FIG. 1) for a guarded VM (e.g., VM 106-n). If so, block 608 may be followed by block 610. Otherwise block 610 may be followed by block 614. As described above, an administrator may select one or more of the restricted operations to be performed on VM 106-n, and the VM owner may approve one or more of the selected operations. Hypervisor 104 may determine a VM owner has at least partially approved VM modification request 118 for guarded VM 106-*n* when it receives instruction from VM manager 112 to unlock VM 106-*n* and enable the approved operations.

In block 610, hypervisor 104 sets the VM modification flag 136 (FIG. 1) for guarded VM 106-*n* in table 124. Block 610 may be followed by block 611.

In block 611, hypervisor 104 unlocks guarded VM 106-*n* by enabling the selected operations approved by the VM owner on VM 106-*n*. Block 611 may be followed by block 612.

In block 612, after changes have been made to guarded VM 106-*n* with the VM owner's approval, hypervisor locks guarded VM 106-*n*. Specifically, hypervisor 104 receives instruction from VM manager 112 to lock VM 106-*n* by disabling all the restricted operations. Block 612 may be followed by block 613.

In block 613, hypervisor 104 copies VM configuration file 126 and overwrites the old VM configuration file 132 in backup folder 134 to capture the current state of VM 106-*n*. Hypervisor 104 also generates a checksum for the new VM configuration file 132 and stores it in backup folder 134. Block 613 may be followed by block 614.

In block 614, hypervisor 104 determines if a VM, such as VM 106-*n*, is to power on. If so, block 614 may be followed by block 616. Otherwise method 600 may end at block 614 or loop back to block 602.

In block 616, hypervisor 104 determines if the authorized VM modification flag 136 for VM 106-*n* is set in table 124. If so, hypervisor 104 may reset the authorization VM modification flag 136 for VM 106-*n* and block 616 may be followed by block 622. Otherwise block 616 may be followed by block 618.

In block 618, hypervisor 104 generates a checksum of VM configuration file 126 in home folder 130 and compares it against the checksum stored in backup folder 134. Block 618 may be followed by block 620.

In block 620, hypervisor 104 determines if the checksums match. If no, block 620 may be followed by block 622. Otherwise block 620 may be followed by block 624.

In block 622, hypervisor 104 copies VM configuration file 132 from backup folder 134 and overwrites the VM configuration file 126 in home folder 130. Block 622 may be followed by block 624.

In block 624, hypervisor 104 proceeds to power on VM 106-*n*. Method 600 may end at block 624 or loop back to block 602.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to safeguard virtual machines (VMs), comprising:
designating a VM as a guarded VM by making a first change to a configuration file of the designated VM to disable a plurality of restricted operations that can be performed on the designated VM with permission from an owner of the designated VM;
receiving a request to perform at least some of the plurality of the restricted operations on the designated VM;
sending the request to perform the at least some of the plurality of the restricted operations on the designated VM to the owner;
and
in response to the owner approving the request:
unlocking the designated VM by making a second change to the configuration file of the designated VM to enable the at least some of the plurality of the restricted operations on the designated VM for a specified period of time;
performing the at least some of the plurality of the restricted operations on the designated VM based on the request;
locking the designated virtual machine by making a third change to the configuration file of the designated VM to disable the at least some of the plurality of the restricted operations on the designated VM;
capturing a state of the designated VM by copying the configuration file of the designated VM to a location with limited access; and
when the designated VM is to be powered on, powering on the designated VM with the copied configuration file of the designated VM.

2. The method of claim 1, further comprising:
generating an authorization key for the designated VM;
sending the authorization key to a requester of the request to perform the at least some of the plurality of the restricted operations on the designated VM; and
receiving and verifying the authorization key for the designated VM from the requester before enabling the at least some of the plurality of the restricted operations on the designated VM.

3. The method of claim 1, further comprising at least one of encrypting user data written to a virtual disk file of the designated VM and controlling access to a home folder of the designated VM.

4. The method of claim 1, in response to the owner approving the request, further comprising:
setting an authorized VM modification flag for the designated VM that indicates the approval by the owner before enabling the at least some of the plurality of the restricted operations on the designated VM, wherein the authorized VM modification flag is accessible by a hypervisor of the designated VM;
after changes are made to the designated VM, copying the configuration file of the designated VM from a home folder of the designated VM to the location with limited access, wherein the location corresponds to a backup folder of the designated VM; and
when the authorized VM modification flag is set:
copying the configuration file of the designated VM from the backup folder of the designated VM to the home folder of the designated VM; and
powering on the designated VM using the configuration file in the home folder of the designated VM.

5. The method of claim 4, in response to the owner not approving the request, further comprising:
wherein the designating the VM as the guarded VM further comprises generating a first checksum of the configuration file of the designated VM and copying the first checksum to the backup folder of the designated VM; and
when the authorized VM modification flag is not set:
comparing a second checksum of the configuration file in the home folder of the designated VM with the first checksum in the backup folder of the designated VM;

when the first checksum and the second checksum do not match, copying the configuration file of the designated VM from the backup folder of the designated VM to the home folder of the designated VM; and powering on the designated VM using the configuration file in the home folder of the designated VM.

6. A virtual machine (VM) system, comprising:

a physical server comprising a first memory comprising a first set of instructions for a hypervisor that supports one or more VMs; and a VM manager comprising a second memory comprising a second set of instructions to safeguard the one or more VMs, and a processor to execute the second set of instructions in the second memory to:

designate a VM from the one or more VMs as a guarded VM by causing the hypervisor to make a first change to a configuration file of the designated VM to disable a plurality of restricted operations that can be performed on the designated VM with permission from an owner of the designated VM;

receive a request to perform at least some of the plurality of the restricted operations on the designated VM;

send the request to perform the at least some of the plurality of the restricted operations on the designated VM to the owner; and in response to the owner approving the request, cause the hypervisor to:

unlock the designated VM by making a second change to the configuration file of the designated VM to enable the at least some of the plurality of the restricted operations on the designated VM for a specified period of time;

perform the at least some of the plurality of the restricted operations on the designated VM based on the request;

lock the designated virtual machine by making a third change to the configuration file of the designated VM to disable the at least some of the plurality of the restricted operations on the designated VM;

capture a state of the designated VM by copying the configuration file of the designated VM to a location with limited access; and when the designated VM is to be powered on, power on the designated VM with the copied configuration file of the designated VM.

7. The VM system of claim 6, wherein the processor of the VM manager further executes the second set of instructions to:

generate an authorization key for the designated VM;

send the authorization key to a requester of the request to perform the at least some of the plurality of the restricted operations on the designated VM; and receive and verify the authorization key for the designated VM from the requester before enabling the at least some of the plurality of the restricted operations on the designated VM.

8. The VM system of claim 6, wherein the hypervisor performs at least one of:

encrypting user data written to a virtual disk file of the designated VM; and controlling access to a home folder of the designated VM.

9. The VM system of claim 6, in response to the owner approving the request, the hypervisor further performs:

setting an authorized VM modification flag, accessible by the hypervisor, for the designated VM that indicates the approval by the owner;

after changes are made to the designated VM, copying the configuration file of the designated VM from a home folder of the designated VM to the location with limited access, wherein the location corresponds to a backup folder of the designated VM; and when the authorized VM modification flag is set:

copying the configuration file of the designated VM from the backup folder of the designated VM to the home folder of the designated VM; and powering on the designated VM using the configuration file in the home folder of the designated VM.

10. The VM system of claim 9, in response to the owner not approving the request, the hypervisor further performs:

generating a first checksum of the configuration file of the designated VM and copying the first checksum to the backup folder of the designated VM; and when the authorized VM modification flag is not set:

comparing a second checksum of the configuration file of the designated VM in the home folder of the designated VM with the first checksum in the backup folder of the designated VM;

when the first checksum and the second checksum do not match, copying the configuration file of the designated VM from the backup folder of the designated VM to the home folder of the designated VM; and powering on the designated VM using the configuration file in the home folder of the designated VM.

11. A non-transitory, computer-readable storage medium encoded with instructions executable by a processor to:

designate a virtual machine (VM) as a guarded VM by making a first change to a configuration file of the designated VM to disable a plurality of restricted operations that can be performed on the designated VM with permission from an owner of the designated VM;

receive a request to perform at least some of the plurality of the restricted operations on the designated VM;

send the request to perform the at least some of the plurality of the restricted operations on the designated VM to the owner; and in response to the owner approving the request:

unlock the designated VM by making a second change to the configuration file of the designated VM to enable the at least some of the plurality of the restricted operations on the designated VM for a specified period of time;

perform the at least some of the plurality of the restricted operations on the designated VM based on the request;

lock the designated virtual machine by making a third change to the configuration file of the designated VM to disable the at least some of the plurality of the restricted operations on the designated VM;

capture a state of the designated VM by copying the configuration file of the designated VM to a location with limited access; and when the designated VM is to be powered on, power on the designated VM with the copied configuration file of the designated VM.

12. The non-transitory, computer-readable storage medium of claim 11, further comprising instructions executable by the processor to:
generate an authorization key for the designated VM;
send the authorization key to a requester of the request to perform the at least some of the plurality of the restricted operations on the designated VM; and
receive and verify the authorization key for the designated VM from the requester before enabling the at least some of the plurality of the restricted operations on the designated VM.

13. The non-transitory, computer-readable storage medium of claim 11, further comprising instructions executable by the processor or another processor to perform at least one of encrypting user data written to a virtual disk file of the designated VM and controlling access to a home folder of the designated VM.

14. The non-transitory, computer-readable storage medium of claim 11, further comprising instructions executable by the processor or another processor to, in response to the owner approving the request:
set an authorized VM modification flag for the designated VM that indicates the approval by the owner, wherein the authorized VM modification flag is accessible by a hypervisor of the designated VM;
after changes are made to the designated VM, copy the configuration file of the designated VM from the home folder of the designated VM to the location with limited access, wherein the location corresponds to a backup folder of the designated VM; and
when the authorized VM modification flag is set:
copy the configuration file of the designated VM from the backup folder of the designated VM to the home folder of the designated VM; and
power on the designated VM using the configuration file in the home folder of the designated VM.

15. The non-transitory, computer-readable storage medium of claim 14, further comprising instructions executable by the processor or the other processor to, in response to the owner not approving the request:
generate a first checksum of the configuration file of the designated VM and copy the first checksum to the backup folder of the designated VM as a part of designating the VM as the guarded VM; and
when the authorized VM modification flag is not set:
compare a second checksum of the configuration file in the home folder of the designated VM with the first checksum in the backup folder of the designated VM;
when the first checksum and the second checksum do not match, copy the configuration file of the designated VM from the backup folder to the home folder of the designated VM; and
power on the designated VM using the configuration file in the home folder of the designated VM.

* * * * *